Patented Oct. 4, 1932

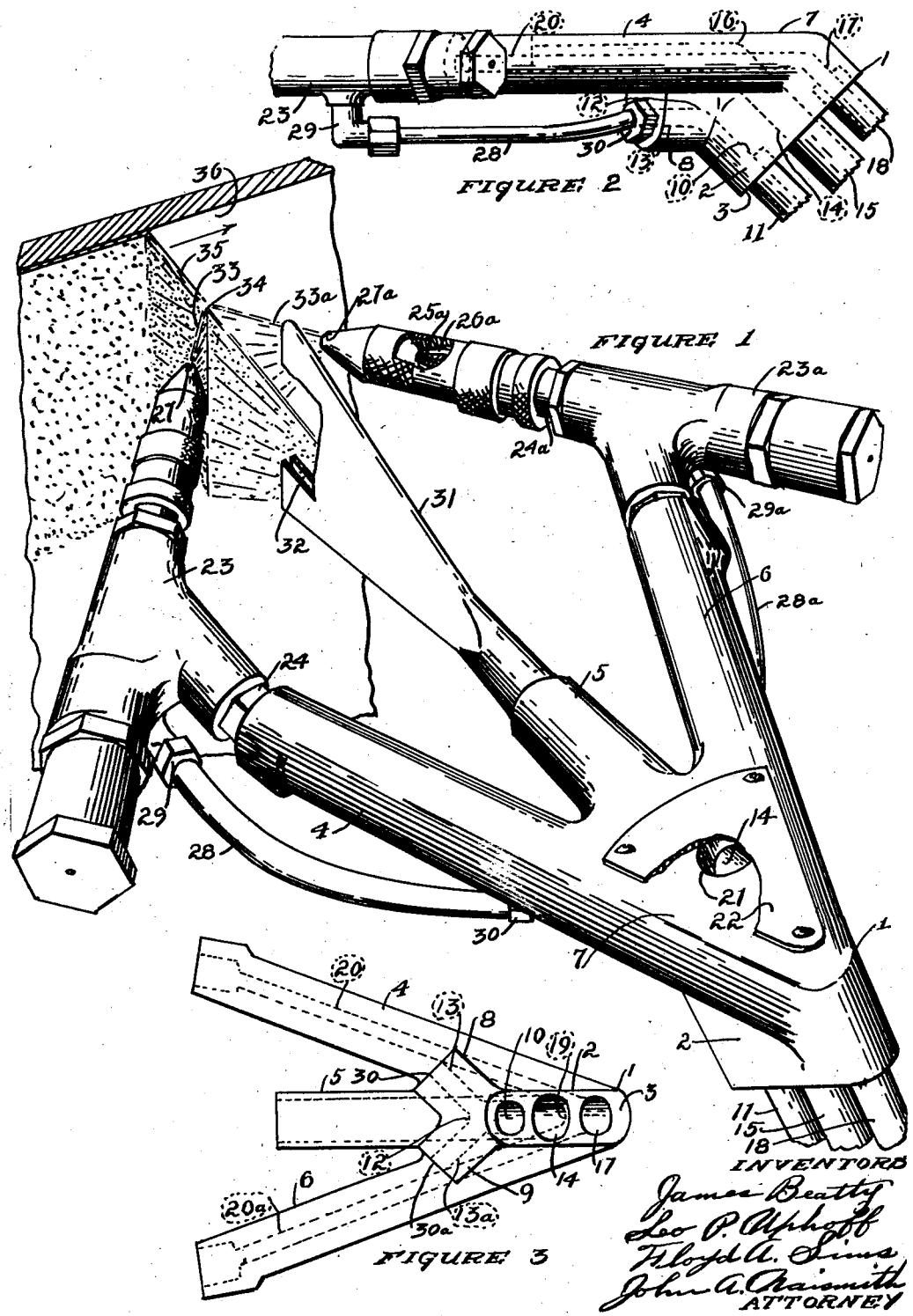

1,881,345

UNITED STATES PATENT OFFICE

JAMES BEATTY, LEO P. UPHOFF, AND FLOYD A. SIMS, OF SAN JOSE, CALIFORNIA

COATING DEVICE

Application filed January 27, 1931. Serial No. 511,564.

This invention relates particularly to means for effecting the admixture of desired liquid and dry materials in desired proportions and depositing the same in a coating of uniform thickness upon the surface to be covered.

It is one object of the invention to provide a device that will form a satisfactory intimate mixture of a liquid capable of being passed through a spraying nozzle, such as asphalt emulsion, and a dry material capable of being discharged through a nozzle, such as sand.

It is another object of the invention to provide a device of the character indicated that will mix the materials in such a manner that every particle of the dry material will be completely coated with the liquid, and that will deposit the mixture rapidly and smoothly upon a given surface.

It is still another object of the invention to provide a device of the character indicated that will be economical to manufacture, of few parts, simple in form and construction, quickly and easily assembled, strong, durable and highly efficient in its practical application.

In the drawing:

Figure 1 is a perspective illustration of a device embodying our invention, parts broken away.

Figure 2 is a side elevation of a portion of the device.

Figure 3 is a bottom plan view of the body portion of the device.

The device as herein disclosed comprises a body portion 1, which is preferably cast in one piece. The base part 2 is oblong in shape and has a flat, oblong surface 3. Disposed on the opposite side of part 2 to the face 3, and directed outwardly, fan-wise, therefrom, and at an angle of forty-five degrees to face 3, are fingers 4, 5 and 6, the finger 5 bisecting the angle formed by fingers 4 and 6. This angular arrangement of the fingers results in the formation of a flat surface 7 on the opposite side of the base to surface 3. Also formed on base 1 and immediately below fingers 4, 5, 6, are bosses 8 and 9, these bosses being directed outwardly and forwardly toward the outer ends of fingers 4 and 6 respectively. A conduit 10 is formed in base 1 to communicate with a supply pipe 11, and forked at 12 to pass through bosses 8 and 9 as shown at 13 and 13a. Another conduit 14 is formed in base 1 to communicate with supply pipe 15 and turning at an angle 16 to pass through finger 5. A third conduit 17 is formed in base 1 to communicate with supply pipe 18 and forked at 19 to pass through the fingers 4 and 6 as shown at 20 and 20a respectively. The orifice 21 in surface 7 communicates with conduit 14 and is closed by a plate 22 fixedly mounted thereon.

At 23 and 23a are shown two spray nozzles, identical in construction and mounted on the ends of fingers 4 and 6 as shown at 24 and 24a. These nozzles are of the type disclosed in our copending application bearing Serial No. 485,360, filed Sept. 30, 1930, and are disposed in the plane of the several fingers with their projected longer axes intersecting the projected longer axis of the central finger 5. The liquid and air passages in one of the nozzles are shown at 25a and 26a respectively. The nozzles are provided with discharge orifices 27—27a arranged to form a fan-like spray in planes at right angles to the plane of the nozzles.

At 28—28a are pipes connecting the nozzles 23—23a at 29—29a with the conduit branches 13—13a at 30—30a, for conveying asphalt emulsion to the nozzles.

At 31 is shown a nozzle having a round base portion seated in the end of finger 5 and flattened at its discharge end to form a long narrow discharge opening as 32 disposed at right angles to the plane of the fingers whereby the material discharged therefrom will emerge in a fan-shaped stream directly into the angle between the fan-shaped discharges from the two nozzles 23—23a.

As may now be readily understood, the supply pipe 15 communicates with a source of sand supply under pressure, not shown, and the sand introduced thereby is carried through conduit 14 to be discharged from nozzle 31 at 32.

The supply pipe 18 communicates with a source of air supply under pressure, not shown, and is carried through conduit 17 with its branches 20—20a to the two nozzles 23—23a to be discharged at 27—27a.

The supply pipe 11 is connected to a source of liquid supply under pressure, not shown, in the present case asphalt emulsion being referred to for the purpose of illustration. The liquid emulsion is carried through conduit 10 and its branches 13—13a to the two nozzles 23—23a where it is mixed with the air and discharged at 27—27a.

When the device is in operation the fan-shaped liquid discharged at 33—33a merges in a single stream at 34 and at the same time the fan-shaped stream of sand is introduced thereto, the whole forming a single thin sheet 35 which is deposited upon the surface 36 by moving the device slowly thereover. In the illustration one-half, only, of the material discharged is shown.

By means of the method described each grain of sand is completely encased in the liquid before it is deposited on the surface, and the sand is discharged with only enough force to carry it to the liquid where it is sucked in by the converging streams. This method eliminates the great waste of material and power that occurs when the liquid binder is spread upon the surface first and then the sand distributed over it.

Since the casting 1 would gradually be worn away by the sand at angle 16 we provide the orifice 21 at this point, and a plate 22 that may be readily renewed when worn.

While this device is easily handled and manipulated it will cover a comparatively large surface in a short space of time, its capacity being in the neighborhood of one hundred and twenty-five square feet per minute, and this large amount of surface can be covered smoothly and evenly with practically no waste of material, and without loss of time for cleaning and adjusting.

It is to be understood, of course, that while we have herein shown and described one specific embodiment of the invention, changes in form, construction, and method of assembly and operation, as well as application, may be made within the scope of the appended claims.

We claim:

1. A device of the character described comprising, supporting means, a plurality of liquid spraying nozzles mounted thereon and disposed in a common plane with their longer axes converging in the direction of discharge whereby the liquids discharged will merge in a single stream, and having discharge orifices adapted to form fan-like sprays at right angles to the plane of the nozzles, and a nozzle mounted on said supporting means between the first mentioned nozzles and adapted to discharge a fan-like spray of particles of mineral matter into the liquids discharged by the first mentioned nozzles at their line of merging.

2. A device of the character described comprising, supporting means, a pair of liquid spraying nozzles mounted thereon and disposed in a common plane with their longer axes converging in the direction of discharge whereby the liquids discharged will merge in a single stream, and having discharge orifices adapted to form fan-like sprays at right angles to the plane of the nozzles, and a nozzle adapted to spray particles of mineral matter mounted in the support intermediate the first mentioned nozzles and in the plane thereof and having a flattened discharge end forming an oblong discharge opening disposed at right angles to the plane of the nozzles.

3. A device of the character described comprising, supporting means, a pair of air and liquid mixing and spraying nozzles mounted thereon in a common plane with their longer axes converging in the direction of discharge whereby the sprays will merge in a common stream, the said support having a branched conduit formed therethrough and communicating with both nozzles to convey air thereto, and having a second conduit formed therethrough, means for connecting said second conduit with each nozzle to convey liquid thereto, a nozzle mounted on said support between the first mentioned nozzles and in the plane thereof and adapted to discharge a stream of particles of mineral matter into the sprays formed by said first mentioned nozzles at their line of merging, the said support having a conduit formed therethrough communicating with said last mentioned nozzle.

4. In a device of the character described, a supporting element comprising an oblong base portion having an oblong face, a finger projecting therefrom adjacent one end and on the opposite side to said face, a finger projecting therefrom on each side of the first mentioned finger and in angular relation thereto, said fingers lying in a common plane, and a pair of bosses formed thereon adjacent said fingers, said element having a conduit formed therein communicating with said face and the end of the first mentioned finger, a second conduit formed therein communicating with the face and the ends of the second mentioned fingers, and a third conduit formed therein communicating with the face and the ends of said bosses.

5. In a device of the character described, a supporting element comprising, a base portion faced on one side and having a fan-like projection on the opposite side in angular relation to said face and a second projection on the second mentioned side adjoining the first mentioned projection, said element having a conduit formed therein and extending through the center of the first mentioned projection to said face, a second conduit having branches extending through the first mentioned projection on each side of the first conduit and joining to communicate with said face, and a third conduit having branches extending through the second mentioned projection and joining to communicate with said face.

JAMES BEATTY.
LEO P. UPHOFF.
FLOYD A. SIMS.